April 17, 1962   C. E. STOOPS   3,030,288
PRODUCTION OF ALKENYLAMINES

Filed Aug. 17, 1956

INVENTOR.
C. E. STOOPS

BY *Hudson and Young*

ATTORNEYS

United States Patent Office 3,030,288
Patented Apr. 17, 1962

3,030,288
PRODUCTION OF ALKENYLAMINES
Charles E. Stoops, Bartlesville, Okla., assignor to Phillips Petroleum Company, a corporation of Delaware
Filed Aug. 17, 1956, Ser. No. 604,822
17 Claims. (Cl. 204—158)

This invention relates to the production of alkenylamines by irradiating a mixture of a conjugated diene and ammonia or a primary or secondary amine.

The reaction of a conjugated diene such as butadiene, isoprene, and the like with ammonia or an amine such as a primary or secondary amine to produce organic bases has been carried out using catalysts such as alkali metals, difficultly reducible metal oxides, graphitic substances and alkaline earth oxides. The products of such reactions have been identified broadly as alkenylamines and they apparently comprise mixtures of isomers. It has now been discovered that reactions of these materials can be effected without the addition of a catalyst if the mixture of a conjugated diene with ammonia or a primary or secondary amine is subjected to ionizing radiation.

The following are objects of this invention:
It is an object of this invention to provide a new method of producing high molecular weight alkenylamines. A further object of this invention is to provide a method of producing alkenylamines by subjecting a mixture of a conjugated diolefin and ammonia to ionizing radiation.

Figure 1:
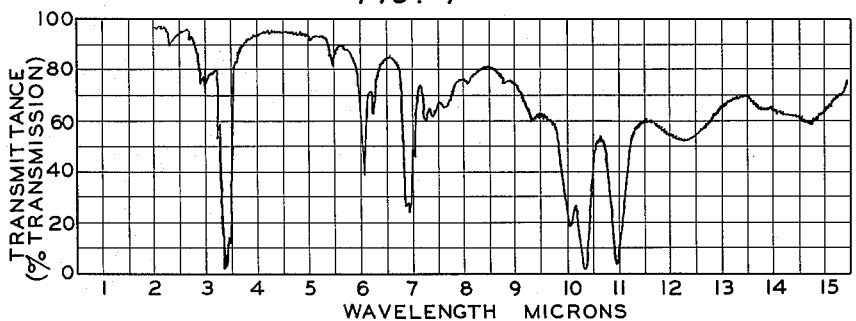
Figure 2:
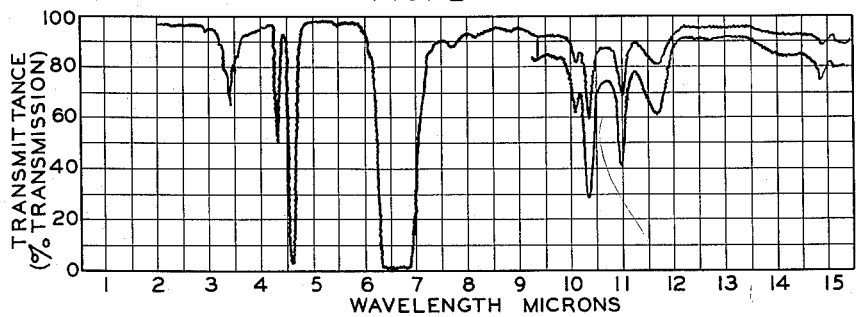
Figure 3:
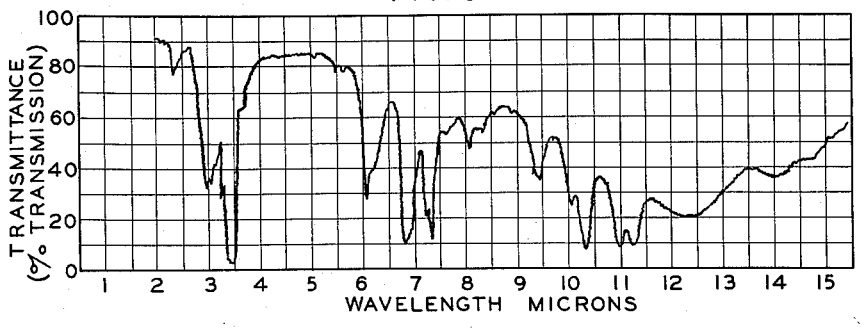

Further objects and advantages of this invention will be apparent to one skilled in the art upon reading this disclosure, accompanying and forming a part thereof is a drawing comprising FIGURE 1, an infrared absorption spectrum of a product produced by the process of this invention, FIGURE 2, the absorption spectrum of a solution of the material of FIGURE 1 dissolved in carbon disulfide, and FIGURE 3, the absorption spectrum of another product produced by the process of this invention.

According to my invention alkenylamines are produced by subjecting a mixture of a conjugated diene and ammonia or a primary or secondary amine to ionizing radiation. The products comprise materials formed by the reaction of at least two mols of the conjugated diene with one mol of the nitrogen-containing compound and they are primary, secondary, or tertiary alkenylamines depending upon whether the nitrogen-containing starting material is ammonia, a primary, or a secondary amine. The products are further characterized as having an average of about one double bond per mol of conjugated diene reacting with these double bonds being present in cis, trans, and vinyl configuration.

The conjugated dienes employed in the production of the alkenylamines of this invention are those which contain from 4 to 12 carbon atoms per molecule and include 1,3-butadiene, isoprene, 1,3-pentadiene, 2,3-dimethyl-1,3-butadiene, 2-methyl-1,3-pentadiene, 2-phenyl-1,3-butadiene, 2,3-dimethyl-1,3-hexadiene, 2-methoxy-3-ethyl-1,3-butadiene, 2-ethoxy-3-ethyl-1,3-hexadiene, 2-cyano-1,3-butadiene, 2,3-diethyl-1,3-octadiene, and the like. Furthermore mixtures of these conjugated dienes can be used.

Nitrogen-containing compounds which are applicable for reaction with conjugated dienes in accordance with the process of this invention are represented by the formula

wherein R is hydrogen or an alkyl, aralkyl, or cycloalkyl radical or where both R's can be a hydrocarbon radical, such as a tetramethylene or pentanemethylene radical, forming a heterocyclic ring with the nitrogen atom, and where the total number of carbon atoms in the R groups does not exceed 10. Examples of compounds which may be reacted with conjugated dienes include ammonia, methylamine, dimethylamine, ethylamine, diethylamine, propylamine, dibutylamine, benzylamine, piperidine, cyclohexylamine, amylamine, and decylamine. Mixtures of ammonia with a primary or secondary amine can be used as well as mixtures of amines.

The reaction of these conjugated dienes with ammonia in the presence of ionizing radiation produces only primary alkenylamines. When primary and secondary amines are employed in place of the ammonia the products are secondary and tertiary alkenylamines. The product formed by the reaction of a conjugated diene with ammonia or one of these amines is a mixture of unsaturated amines in which one

group (R as defined above) is present with at least 2, and generally more, conjugated diene units. Thus, using butadiene and ammonia, for example, these products have the general formula $H_2N(C_4H_6)_xH$ where $x$ is generally 2 to 15, inclusive.

A preferred embodiment of the invention comprises subjecting a mixture of 1,3-butadiene and ammonia to ionizing radiation to produce a mixture of unsaturated amines containing, on the average, one amino group per 20 to 40 C atoms.

According to the process herein described, a conjugated diene is mixed with ammonia or a primary or secondary amine in a mol ratio of nitrogen compound to conjugated diene in the range between 0.1:1 and 1000:1, preferably in the range between 0.5:1 and 5:1. The process is preferably effected under sufficient pressure to maintain the reactants in liquid phase or dense phase but if desired, the process can be carried out in the gaseous phase.

Irradiation is preferably conducted by placing the mixture of conjugated diene and nitrogen-containing compound adjacent a spent fuel element or group of fuel elements after their withdrawal from a nuclear reactor. Irradiation can be conveniently carried out while the elements are "cooling off" in a canal adjacent the reactor, which canal is filled with deionized water. The fuel elements can be any suitable type which are capable of producing radiation intensities within the range hereinafter specified. In one example, these fuel elements were removed from a nuclear reactor and the active portion of the fuel elements consisted of a series of uranium plates enriched in $U^{235}$ each sheet covered with a relatively thin sheet of aluminum. The work described in the following examples was done at the Materials Testing Reactor operated by Phillips Petroleum Company described in an article by John R. Huffman appearing in Nucleonics 12, No. 4, 21–26, April 1954. Pictures of spent fuel elements in the canal are shown on page 102 of the April 1956 issue of Popular Science Monthly.

The material to be irradiated is placed sufficiently close to the fuel elements to obtain a dosage of $10^3$ to $10^{10}$, preferably $10^5$ to $10^8$, roentgens per hour and a total dosage of $10^5$ to $10^{11}$, preferably $10^7$ to $10^9$, roentgens. The radiation produced by the spent fuel elements previously described is gamma radiation. Other types of ionizing radiation such as beta rays, X-rays, alpha rays, and the like can be employed provided the prescribed radiation intensity and dosage are utilized. The time of the radiation can vary from a few seconds to several hours provided the prescribed dosage and radiation intensity are maintained. Any suitable source of radiation can be employed in this process.

The temperature at which the irradiation is conducted may vary in the range from $-100$ to $275°$ F. but will preferably be in the range between 50 and $100°$ F.

It is preferable to exclude solvents or other extraneous materials in order to prevent side reactions and the corresponding production of undesired products.

The following examples disclose specific operating details of my invention and disclose specific products produced thereby. These examples are set forth to illustrate my invention and should not be considered unduly limiting.

*Example I*

A stainless steel bomb of 300 milliliter capacity, which had previously been evacuated, was charged with a 1:1 mol mixture (72 grams total) of butadiene and ammonia. Pressure in the bomb was sufficient to maintain the reactants in liquid phase at the temperature employed. The material in the bomb was irradiated in a field of gamma rays from spent fuel elements from the Materials Testing Reactor at Arco, Idaho, at a canal temperature of $70°$ F. for a time sufficient to provide a dosage of $1 \times 10^8$ roentgens. On account of the shielding effect of the steel container, the actual dosage received by the reaction mixture was $5 \times 10^7$ roentgens. The irradiated sample was removed from the gamma ray field. After the unreacted butadiene and ammonia were allowed to weather off, 3.8 grams of a clear, brown liquid which had an amine odor was obtained. The product has an average molecular weight (boiling point elevation in benzene) of 392. Analysis for nitrogen by the ter Meulen method gave a value of 3.6 weight percent. This corresponds to $$H_2N(C_4H_6)_7H$$

The product was subjected to an infrared analysis, the spectrum being shown in FIGURE 1. Inspection of this spectrum shows the characteristics N—H stretching in the 3 micron region, two bands indicating the $-NH_2$ group. The band in the 6.25 micron region indicates hydrogen deformation and the band in the 12.25 region indicates hydrogen wagging. By observing the amount of shifting of the hydrogen deformation band in the 6.25 micron region, an indication is obtained as to the type of carbon atom to which the $-NH_2$ group is attached. If the shifting is toward the longer wave length, it indicates that the $-NH_2$ group is attached to a secondary carbon atom

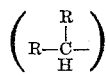

$$\left( R-\underset{H}{\overset{R}{C}}- \right)$$

while if the shift is toward the shorter wave length, it indicates that the $-NH_2$ group is attached to a primary carbon atom $(R-CH_2-)$.

A band in the 11.25 micron region indicates the presence of a branched vinyl group; at 11.00 a terminal vinyl group; at 10.35 a transolefinic linkage; and at 14.70 a cis olefin bond. In the 6.08–6.10 micron region, the bands corresponding to the various types of carbon to carbon stretching bonds

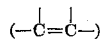

$$(-\overset{|}{C}=\overset{|}{C}-)$$

are found.

The various types of methyl groups are indicated by the presence of bands in the 7.18–7.30 micron region. If two or more bands occur in this region, isopropyl and/or tertiary butyl groups are indicated. This band is not apparent in FIGURE 1. There is no indication of the presence of nitriles, isonitriles, or secondary amines. The presence of olefinic bonds in cis, trans, and vinyl configuration indicates that the butadiene reacted by both 1,4 and 1,2 addition.

FIGURE 2 is the spectrum obtained to measure olefin distribution. A 1.669 weight percent solution of the amine in carbon disulfide was prepared. The double trace on the right of the figure are the results of two runs made with different sample thickness. The trans internal band appears at 10.3 microns and the terminal vinyl band at 11.0 microns. Based on this work, the analysis is as follows:

|  | Double Bonds Per Molecule | Percent Total Unsaturation Represented by This Group | Weight Percent of Total Polymer Represented by This Group |
|---|---|---|---|
| Trans | 4.2 | 61 | 57 |
| Vinyl | 2.0 | 29 | 27 |
| Cis | 0.7 | 10 | Not determined |

*Example II*

A stainless steel bomb of 300 ml. capacity, which had previously been evacuated, was charged with a 4:1 mol mixture (65 grams ammonia, 54 grams butadiene) of ammonia to butadiene. Pressure in the bomb was sufficient to maintain the reactants in liquid phase at the temperature employed. The material in the bomb was irradiated in a field of gamma rays from spent fuel elements from the Materials Testing Reactor at Arco, Idaho, at a canal temperature of $84°$ F. The actual dosage rate received by the reaction mixture was $1.08 \times 10^7$ roentgens per hour and the material was exposed for 9.3 hours to give a total dosage of $1.0 \times 10^8$ roentgens. The irradiated sample was removed from the gamma ray field, and after unreacted butadiene and ammonia were allowed to weather off, 4.2180 grams of a liquid product remained. The product had an average molecular weight of 275. Analysis for nitrogen by the ter Meulen method gave a value of 6.3 weight percent.

FIGURE 3 is the infrared spectrum for this run. The two bands in the 3 micron region again indicating the $-NH_2$ group. The hydrogen deformation and wagging at 6.25 and 12.25 microns, respectively, are also present. It will be noted that the band in the 6.25 micron region is shifted to the left compared to that in FIGURE 1, this indicating that the $-NH_2$ is attached to a primary carbon atom. The double bond in the 7.18–7.30 region indicates the presence of isopropyl and/or tertiary butyl groups which were not present in FIGURE 1. Also present is a band at 11.25 microns indicating a branched vinyl group.

From these runs, the important bands characteristic of the alkenylamines of this invention are apparent. These bands are:

|  | Microns |
|---|---|
| N—H stretching | 3.0 |
| Hydrogen deformation | 6.25 |
| Transolefinic linkage | 10.35 |
| Terminal vinyl group | 11.00 |
| Hydrogen wagging | 12.25 |

These products are useful for repelling insects such as flies, mosquitoes, ants, and fleas from surfaces frequented by them. When employing these repellant materials in a non-volatile solvent or inert powder carrier, it is usually preferred that the concentration of the active ingredient be not less than about 0.5 percent by weight. The upper limit is that dictated by economy, or the limit of solubility in a given solvent. In certain instances, it will be advantageous to apply the repellant per se. Generally the repellant is applied by spraying a liquid composition, preferably containing a volatile solvent, on or near a surface from which insects are to be repelled in an amount to give 1 to 10 grams of active ingredient per hundred square feet of surface.

As many possible embodiments may be made of this invention without departing from the scope thereof, it is to be understood that all matter herein set forth is to be interpreted as illustrative and not in a limiting sense.

I claim:

1. A process of making alkenylamines which comprises subjecting a mixture containing a conjugated diene and at least one compound selected from the group consisting of ammonia, primary and secondary amines to ionizing radiation having a minimum potential equivalent to that of X-rays at a level of $10^3$ to $10^{10}$ roentgens per hour of a time sufficient to produce a total dosage of $10^5$ to $10^{11}$ roentgens.

2. A process of making alkenylamines which comprises subjecting a mixture containing a conjugated diene and at least one compound selected from the group consisting of ammonia, primary and secondary amines to ionizing radiation having a minimum potential equivalent to that of X-rays at a level of $10^5$ to $10^8$ roentgens per hour for a time sufficient to produce a total dosage of $10^7$ to $10^9$ roentgens.

3. A process of making alkenylamines which comprises subjecting a mixture containing a conjugated diene containing not to exceed 12 carbon atoms and a nitrogen compound selected from the group consisting of compounds having the formula

where R is selected from the group consisting of hydrogen, alkyl, aralkyl, cycloalkyl, and cyclic rings wherein both R's form a heterocyclic ring with the nitrogen atom, to ionizing radiation having a minimum potential equivalent to that of X-rays at a level of $10^3$ to $10^{10}$ roentgens per hour for a time sufficient to produce a total dosage of $10^5$ to $10^{11}$ roentgens.

4. A process of making alkenylamines which comprises subjecting a mixture containing a conjugated diene containing not to exceed 12 carbon atoms and a nirtogen compound selected from the group consisting of compounds having the formula

where R is selected from the group consisting of hydrogen, alkyl, aralkyl, cycloalkyl, and cylic rings wherein both R's form a heterocyclic ring with the nitrogen atom, to ionizing radiation having a minimum potential equivalent to that of X-rays at a level of $10^5$ to $10^8$ roentgens per hour for a time sufficient to produce a total dosage of $10^7$ to $10^9$ roentgens.

5. The process of claim 3 wherein the ionizing radiation is gamma radiation.

6. The process of claim 5 wherein the diene is butadiene and the nitrogen compound is ammonia.

7. The process of claim 3 wherein the nitrogen compound is methyl amine.

8. The process of claim 3 wherein the nitrogen compound is dimethyl amine.

9. The process of claim 3 wherein the nitrogen compound is ethyl amine.

10. The process of claim 3 wherein the nitrogen compound is diethyl amine.

11. The process of claim 5 wherein the diene is isoprene.

12. The process of producing alkenylamines which comprises subjecting a mixture of a conjugated diene and ammonia to the radiations of a spent fuel element from a nuclear reactor for a time sufficient to produce an appreciable quantity of an alkenylamine, said radiations being at a level of at least $10^3$ roentgens per hour and said time being sufficient to produce a total dosage of at least $10^5$ roentgens.

13. A process of producing alkenylamines which comprises subjecting a mixture of a conjugated diene and ammonia to the radiations of a spent uranium-235 fuel element for a time sufficient to convert the diene and ammonia to an alkenylamine, said radiations being at a level of at least $10^3$ roentgens per hour and said time being sufficient to produce a total dosage of at least $10^5$ roentgens.

14. The process of producing an alkenylamine which comprises subjecting a mixture of butadiene and ammonia to the radiations of a spent fuel element from a nuclear reactor for a time sufficient to produce an appreciable quantity of an alkenylamine, said radiations being at a level of at least $10^3$ roentgens per hour and said time being sufficient to produce a total dosage of at least $10^5$ roentgens.

15. The process of claim 14 wherein the alkenylamine produced has infrared absorption bands at 3.0, 6.25, 10.35, 11.00, and 12.25 microns.

16. A process of producing an alkenylamine comprising subjecting a mixture of butadiene and ammonia, 1 to 4 mols of ammonia being used per mol of butadiene, to the radiations of a spent fuel element from a nuclear reactor for a time sufficient to produce an appreciable quantity of alkenylamine, said alkenylamine having infrared absorption bands at 3.0, 6.25, 10.35, 11.00 and 12.25 microns, said radiations being at a level of at least $10^3$ roentgens per hour and said time being sufficient to produce a total dosage of at least $10^5$ roentgens.

17. A process of making alkenylamines which comprises subjecting a mixture containing a conjugated diene and at least one compound selected from the group consisting of ammonia, primary and secondary amines to ionizing radiation at a level of about $10^3$ r. to about $10^8$ r. for a time sufficient to give a total dosage of about $10^5$ r. to about $10^{10}$ r.

References Cited in the file of this patent

UNITED STATES PATENTS

| 2,454,746 | Ullyot | Nov. 23, 1948 |
| 2,616,927 | Kauck et al. | Nov. 4, 1952 |
| 2,749,297 | Thomas | June 5, 1956 |

FOREIGN PATENTS

| 461,783 | Canada | Dec. 13, 1949 |

OTHER REFERENCES

Martin: Chemical and Engineering News, vol. 33, No. 14 (Apr. 4, 1955), pages 1424–1428.